United States Patent
Hayashi et al.

(10) Patent No.: US 9,516,192 B2
(45) Date of Patent: Dec. 6, 2016

(54) IMAGE FORMING METHOD FOR INCREASING RESOLUTION IN REVERSE MODE

(71) Applicants: Masayuki Hayashi, Osaka (JP); Yoshinori Shirasaki, Osaka (JP); Tatsuya Miyadera, Kanagawa (JP); Motohiro Kawanabe, Osaka (JP); Hiroaki Ikeda, Osaka (JP); Akinori Yamaguchi, Osaka (JP); Tomohiro Ohshima, Osaka (JP)

(72) Inventors: Masayuki Hayashi, Osaka (JP); Yoshinori Shirasaki, Osaka (JP); Tatsuya Miyadera, Kanagawa (JP); Motohiro Kawanabe, Osaka (JP); Hiroaki Ikeda, Osaka (JP); Akinori Yamaguchi, Osaka (JP); Tomohiro Ohshima, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 122 days.

(21) Appl. No.: 14/024,003
(22) Filed: Sep. 11, 2013
(65) Prior Publication Data
US 2014/0078521 A1 Mar. 20, 2014

(30) Foreign Application Priority Data

Sep. 14, 2012 (JP) .................................. 2012-203565

(51) Int. Cl.
H04N 1/40 (2006.01)
(52) U.S. Cl.
CPC .................................. H04N 1/40068 (2013.01)
(58) Field of Classification Search
None
See application file for complete search history.

(56) References Cited

U.S. PATENT DOCUMENTS

| 8,419,151 B2 * | 4/2013 | Yoshida | B41J 2/2132 347/15 |
| 9,019,551 B2 | 4/2015 | Hayashi et al. | |
| 2012/0056961 A1 * | 3/2012 | Kinoshita et al. | 347/118 |
| 2012/0062681 A1 * | 3/2012 | Miyadera | G03G 15/043 347/116 |
| 2013/0071130 A1 | 3/2013 | Hayashi et al. | |
| 2014/0078521 A1 | 3/2014 | Hayashi et al. | |
| 2014/0139607 A1 | 5/2014 | Hayashi et al. | |

FOREIGN PATENT DOCUMENTS

| JO | 2014-58076 A | 4/2014 |
| JP | 2004-155167 | 6/2004 |
| JP | 2013-109295 | 6/2013 |
| JP | 2014-106422 A | 6/2014 |

OTHER PUBLICATIONS

John Kitchin, Illustrating Matrix Transpose Rules in Matrix Multiplication, Aug. 1, 2011.*
U.S. Appl. No. 13/683,248, filed Nov. 21, 2012.

* cited by examiner

*Primary Examiner* — Paul F Payer
(74) *Attorney, Agent, or Firm* — Oblon, McClelland, Maier & Neustadt, L.L.P.

(57) ABSTRACT

An image forming apparatus comprising: a resolution conversion unit configured to convert the resolution of a pixel provided by input image data; a gradation conversion unit configured to perform matrix conversion onto the pixel; and a writing unit configured to perform a write operation, wherein, in the normal mode, the gradation conversion unit performs matrix conversion onto the pixel with reference to the gradation conversion table for the normal mode, and the writing unit performs the write operation of the pixel in a normal order that is the order image data being input into the image forming apparatus, and in the reverse mode, the gradation conversion unit performs matrix conversion onto the pixel with reference to the gradation conversion table for the reverse mode, and the writing unit performs the write operation of the pixel in a reverse order opposite to the normal order.

7 Claims, 9 Drawing Sheets

FIG.5

| PIXEL TYPE INFORMATION | GAMMA LOOK-UP DATA | SETTING VALUE |
|---|---|---|
| 0h | gam_0_r[7:0] | 8' b0000_0000 |
| ⋮ | ⋮ | ⋮ |
| 6h | gam_6_r[7:0] | 8' b1100_1000 |
| ⋮ | ⋮ | ⋮ |
| Ah | gam_a_r[7:0] | 8' b1110_1100 |
| ⋮ | ⋮ | ⋮ |
| Fh | gam_f_r[7:0] | 8' b1111_1111 |

FIG.6

| SUB-SCANNING POSITION | ODD DOT | EVEN DOT |
|---|---|---|
| 1 | gam_#_r[7] | gam_#_r[3] |
| 2 | gam_#_r[6] | gam_#_r[2] |
| 3 | gam_#_r[5] | gam_#_r[1] |
| 4 | gam_#_r[4] | gam_#_r[0] |

FIG.11

| SUB-SCANNING POSITION | ODD DOT | EVEN DOT |
|---|---|---|
| 1 | gam_#_r[3] | gam_#_r[7] |
| 2 | gam_#_r[2] | gam_#_r[6] |
| 3 | gam_#_r[1] | gam_#_r[5] |
| 4 | gam_#_r[0] | gam_#_r[4] |

IMAGE FORMING METHOD FOR INCREASING RESOLUTION IN REVERSE MODE

CROSS-REFERENCE TO RELATED APPLICATIONS

The present application claims priority to and incorporates by reference the entire contents of Japanese Patent Application No. 2012-203565 filed in Japan on Sep. 14, 2012.

BACKGROUND OF THE INVENTION

1. Field of the Invention

The present invention relates to an image forming apparatus and a method for converting gradations.

2. Description of the Related Art

In image forming apparatuses using a light emitting diode array (LEDA) that performs a binary write operation, there has been known a technology for performing matrix conversion upon input multivalued image data to convert gradations of the data to binary when the input multivalued image data is output at high resolution. For example, Japanese Patent Application Laid-open No. 2004-155167 discloses a technology for converting multivalued image data to binary or small-valued image data.

However, when matrix conversion is performed to convert gradations, a pattern of matrix may differ depending on whether a write operation is performed in a regular order or in a reverse order which reverses the regular order.

In the light of the foregoing, there is a need to provide an image forming apparatus and a method for converting gradations that can correctly perform gradation conversion when a write operation is performed in either a regular order or a reverse order.

SUMMARY OF THE INVENTION

It is an object of the present invention to at least partially solve the problems in the conventional technology.

According to an aspect of the invention, an image forming apparatus is provided. An image forming apparatus includes: a resolution conversion unit configured to convert the resolution of a pixel provided by input image data; a gradation conversion unit, including a gradation conversion table, configured to perform matrix conversion onto the pixel whose resolution is converted with reference to the gradation conversion table; and a writing unit configured to perform a write operation according to the pixel the matrix conversion being performed, wherein the image forming apparatus includes a normal mode and a reverse mode, in the normal mode, the gradation conversion unit performs matrix conversion onto the pixel with reference to the gradation conversion table for the normal mode, and the writing unit performs the write operation of the pixel in a normal order that is the order image data being input into the image forming apparatus, and in the reverse mode, the gradation conversion unit performs matrix conversion onto the pixel with reference to the gradation conversion table for the reverse mode, and the writing unit performs the write operation of the pixel in a reverse order opposite to the normal order.

According to another aspect of the invention, a method for performing the image forming apparatus set forth in claim 1 is provided. The method includes: by the resolution conversion unit, converting the resolution of a pixel provided by input image data; by the gradation conversion unit, performing matrix conversion onto the pixel whose resolution is converted with reference to the gradation conversion table; and by the writing unit, performing a write operation according to the pixel the matrix conversion being performed, wherein the image forming apparatus includes a normal mode and a reverse mode, in the normal mode, the gradation conversion unit performs matrix conversion onto the pixel with reference to the gradation conversion table for the normal mode, and the writing unit performs the write operation of the pixel in a normal order that is the order image data being input into the image forming apparatus, and in the reverse mode, the gradation conversion unit performs matrix conversion onto the pixel with reference to the gradation conversion table for the reverse mode, and the writing unit performs the write operation of the pixel in a reverse order opposite to the normal order.

According to further aspect of the invention, a computer readable medium including a computer program product, the computer program product comprising instructions which, when caused by a computer, causes the computer to perform the method set forth in the claim 8.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an exemplary diagram illustrating a gradation conversion table according to the embodiment;

FIG. 6 is an exemplary diagram illustrating a gamma look-up table according to the embodiment;

FIG. 11 is an exemplary diagram illustrating a gamma look-up table according to a first modification.

DETAILED DESCRIPTION OF THE PREFERRED EMBODIMENTS

Exemplary embodiments of an image forming apparatus and a method for converting gradations in accordance with the present invention are described in detail below with reference to the accompanying drawings. The embodiments below are described as an example in which the image forming apparatus of the present invention is applied to an electrophotographic printer; however, the embodiments are not limited thereto. The image forming apparatus of the present invention may be applied to any apparatuses that form an image by electrophotography and, for example, may be applied to electrophotographic copiers or multifunction peripherals (MFPs). An MFP is an apparatus having at least two functions out of printer, copier, scanner, and facsimile functions.

Figure 1:
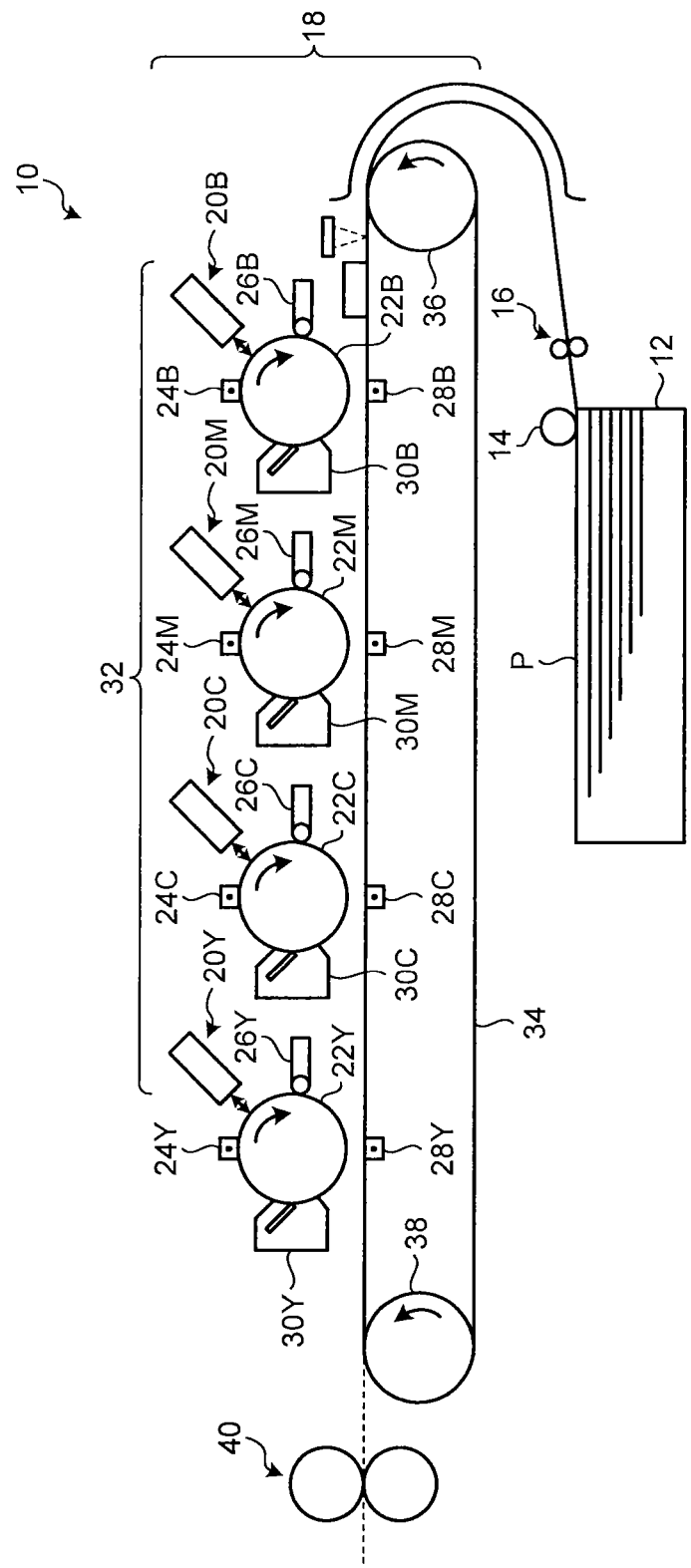
FIG. 1 is a schematic diagram illustrating an exemplary mechanical configuration of a printer according to an embodiment.

FIG. 1 is a schematic diagram illustrating one example of the mechanical configuration of a printer 10 according to the embodiment.

As illustrated in FIG. 1, the printer 10 includes a paper feed tray 12, a paper feeding roller 14, a pair of separating rollers 16, an image forming unit 18, and a fixing unit 40. As described later, the example in FIG. 1 provides a printer known as a tandem type having image making units for each colors arranged along a conveying belt. The printer is not limited thereto.

The paper feed tray 12 holds a plurality of stacked print sheets.

The paper feeding roller 14 is contacted to a print sheet P on the top of the paper feed tray 12 and feeds the contacting print sheet P.

The pair of separating rollers 16 sends the print sheet P fed by the paper feeding roller 14 to the image forming unit 18. When two or more print sheets are fed by the paper feeding roller 14, the pair of separating rollers 16 reversely feed back the print sheet(s) other than the print sheet P to separate the print sheet P from the other print sheets and send only the print sheet P to the image forming unit 18.

The image forming unit 18 that forms an image on the print sheet P separated by the pair of separating rollers 16 includes image making units 20B, 20M, 20C, and 20Y, an LEDA head 32, a conveying belt 34, a driving roller 36, and a driven roller 38.

The image making units 20B, 20M, 20C, and 20Y are arranged in the stated order along the conveying belt 34 in the conveying direction of the conveying belt 34, which conveys the print sheet P separated by the pair of separating rollers 16.

The image making unit 20B includes a photosensitive drum 22B, and a charger 24B, a developing unit 26B, a transferring unit 28B, a photosensitive cleaner (not illustrated), and a neutralizing unit 30B, which are arranged around the photosensitive drum 22B. The image making unit 20B and the LEDA head 32 perform for the photosensitive drum 22B an image making process (a charging process, an exposing process, a developing process, a transferring process, a cleaning process, and a neutralizing process) to form a black toner image on the photosensitive drum 22B.

The image making units 20M, 20C, and 20Y all include common components with the image making unit 20B. The image making units 20M, 20C, and 20Y perform the image making process to form a magenta toner image, a cyan toner image, and a yellow toner image, respectively. The components of the image making unit 20B are described below in detail. The detailed descriptions of the image making units 20M, 20C, and 20Y are omitted.

The photosensitive drum 22B (one example of an image carrier) is driven to rotate by a driving motor, which is not illustrated.

In the charging process, the charger 24B uniformly charges the outer surface of the photosensitive drum 22B rotating in the dark.

In the subsequent exposing process (writing process), the LEDA head 32 (one example of a writing unit) exposes (writes) the outer surface of the rotating photosensitive drum 22B with irradiation light to form an electrostatic latent image corresponding to a black image on the photosensitive drum 22B. The exposing processes with respect to other color images are similarly performed for other photosensitive drums, respectively.

In the subsequent developing process, the developing unit 26B develops the electrostatic latent image formed on the photosensitive drum 22B with black toner to form a black toner image on the photosensitive drum 22B.

In the subsequent transferring process, the transferring unit 28B transfers the black toner image formed on the photosensitive drum 22B to the print sheet P conveyed by the conveying belt 34 at a position where the photosensitive drum 22B faces the print sheet P. A small amount of the toner that is not transferred is left on the photosensitive drum 22B after the transferring process.

In the subsequent cleaning process, the photosensitive cleaner cleans the toner that is not transferred and left on the photosensitive drum 22B.

In the final neutralizing process, the neutralizing unit 30B neutralizes the residual potential on the photosensitive drum 22B. The state of the image making unit 20B is initialized before the image making process is performed again.

The conveying belt 34, which is an endless belt wound on the driving roller 36 and the driven roller 38, adsorbs the print sheet P sent from the pair of separating rollers 16 due to an electrostatic adsorption. The conveying belt 34 endlessly moves because the driving roller 36 is driven to rotate by the driving motor, which is not illustrated, and conveys the adsorbed print sheet P to the image making units 20B, 20M, 20C, and 20Y in the stated order.

The black toner image is transferred by the image making unit 20B on the print sheet P conveyed by the conveying belt 34. Subsequently, the magenta toner image, the cyan toner image, and the yellow toner image are superimposed and transferred by the image making units 20M, 20C, and 20Y respectively. Consequently, a full-color image is formed on the print sheet P.

The fixing unit 40 heats and presses the print sheet P separated from the conveying belt 34 to fix the full-color image formed by the image making units 20B, 20M, 20C, and 20Y on the print sheet P. The print sheet P on which the image is fixed is ejected outside the printer 10.

Figure 2:
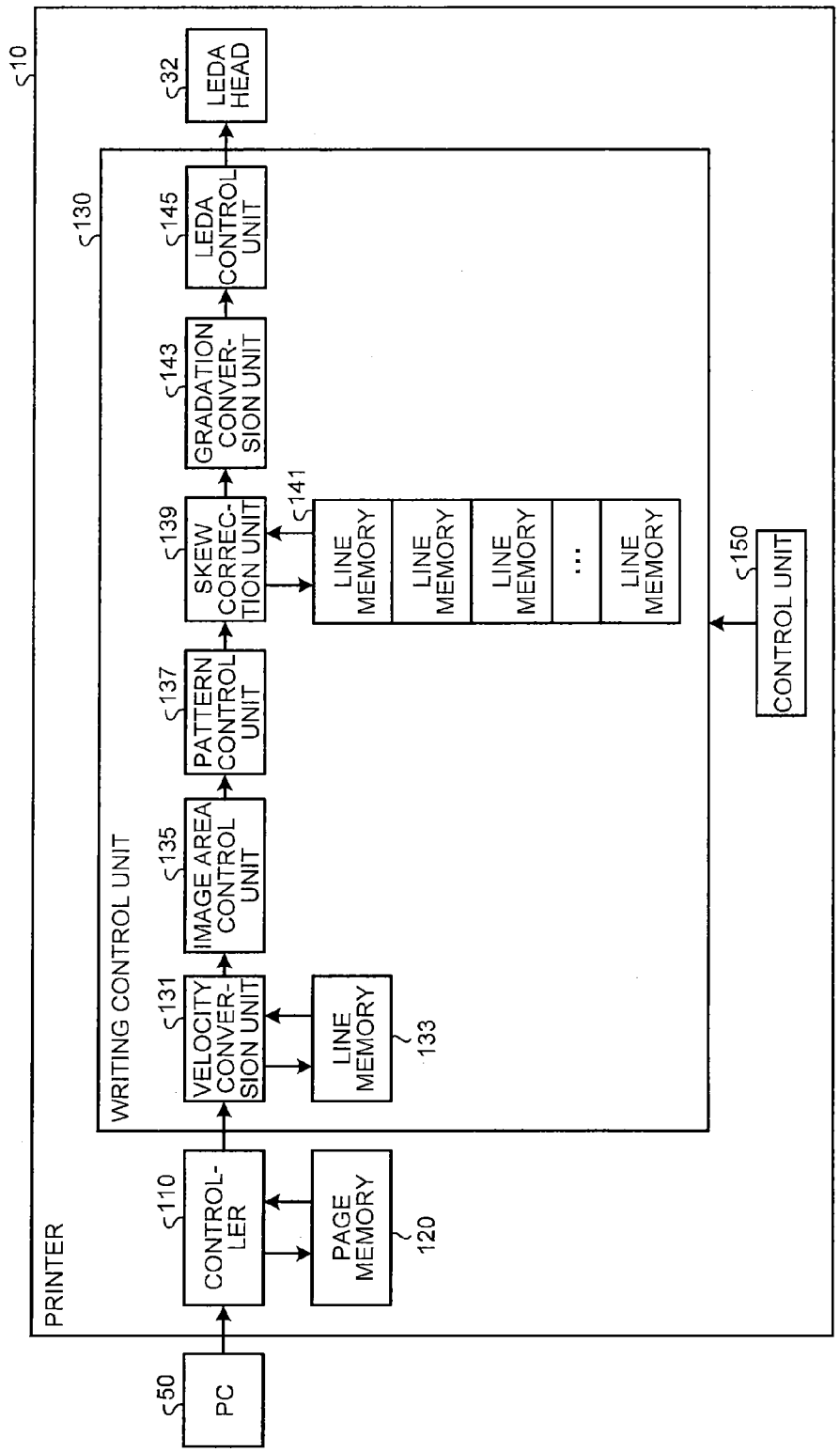
FIG. 2 is a block diagram illustrating an exemplary functional configuration of the printer according to the embodiment.

FIG. 2 is a block diagram illustrating one example of the functional configuration of the printer 10 according to the present embodiment. As illustrated in FIG. 2, the printer 10 includes a controller 110, a page memory 120, a writing control unit 130, a control unit 150, and an LEDA head 32.

The controller 110 receives print data created by a PC 50 (a printer driver installed on the PC 50) via a network (not illustrated). The print data is, for example, described in a page description language (PDL). The controller 110 converts the received print data to image data composed of a plurality of pixels (for example, bitmap data) on the page memory 120 and transfers the image data per one line to the writing control unit 130.

In the present embodiment, the image data transferred (input) to the writing control unit 130 has 600 dots per inch (dpi) and is represented by hexadecimal values; however, the image data is not limited thereto.

The writing control unit 130 causes the LEDA head 32 to emit light (perform a write operation) based on the image data transferred per one line by the controller 110 to form an electrostatic latent image. In other words, the writing control unit 130 processes the image data transferred by the controller 110 as light-emitting data.

In the present embodiment, when in a normal mode, the writing control unit 130 causes the LEDA head 32 to emit light (perform the write operation) in a regular order, where the image data per one line is transferred. When in a mirror mode, the writing control unit 130 causes the LEDA head 32 to emit light (perform the write operation) in an order, which is reverse order to the normal order. Therefore, in the mirror mode, the writing control unit 130 reverses the image data transferred per one line. The data may be reversed at any stage in the operation of the writing control unit 130.

The writing control unit 130 may determine whether it is in the normal mode or the mirror mode by any method. For example, a flag for indicating the normal mode or the mirror mode may be stored on a register, which is included in the writing control unit 130 and is not illustrated in the drawings, so that the writing control unit 130 can determine whether it is in the normal mode or the mirror mode from the value of the flag. The value of the flag is controlled by the control unit 150. As another example, the writing control unit 130 may determine whether it is in the normal mode or the mirror mode based on an external signal created on a substrate, which includes the writing control unit 130 and is not illustrated in the drawings, or may determine whether it is in the normal mode or the mirror mode depending on the type of the LEDA head 32.

The writing control unit 130 includes a velocity conversion unit 131, a line memory 133, an image area control unit 135, a pattern control unit 137, a skew correction unit 139, a plurality of line memories 141, a gradation conversion unit 143, and an LEDA control unit 145.

The controller 110 and the writing control unit 130 differ in their operating clock frequencies. Therefore, the velocity conversion unit 131 sequentially records the image data transferred per one line by the controller 110 in the line memory 133 and sequentially retrieves the recorded image data based on the operating clock of the writing control unit 130 to convert the velocity (frequency) and transfer the image data per one line to the image area control unit 135.

The image area control unit 135 controls the image size and a timing of the image data transferred per one line by the velocity conversion unit 131 to correct a positional deviation depending on the resolution and transfer the image data per one line to the pattern control unit 137.

The pattern control unit 137 performs image processing such as processing to add an internal pattern and trimming processing upon the image data transferred per one line by the image area control unit 135 to transfer the image data per one line to the skew correction unit 139. For example, when processing to require a line memory for jaggy removal and the like is performed as the image processing, the writing control unit 130 includes a line memory for the pattern control unit 137.

The skew correction unit 139 (one example of a resolution conversion unit) sequentially records (writes) the image data transferred per one line by the pattern control unit 137 in the line memories 141 and sequentially retrieves (reads) the line memory to be retrieved among the line memories 141 while switching them depending on the image position to correct a skew and transfer the image data per one line to the gradation conversion unit 143.

In the present embodiment, the skew correction unit 139 performs the skew correction as well as the resolution conversion by controlling the number of writing times of the image data transferred per one line to the line memories 141. The resolution conversion is to comply the resolution of the image data input to the writing control unit 130 with that of the image data (light-emitting data) processed by the LEDA head 32. Generally, it means enhancement of the resolution of the image data.

Specifically, when writing the input image data to the line memories 141, the skew correction unit 139 writes the same image data in the sub-scanning direction multiple times to convert the resolution of the image data in the sub-scanning direction. Moreover, the skew correction unit 139 redefines the number of bits per one pixel to convert the resolution of the image data in the main-scanning direction.

Figure 3:
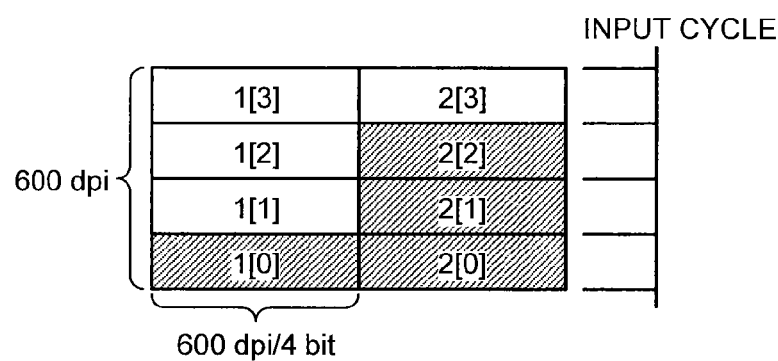
FIG. 3 is an exemplary diagram illustrating image data before conducting resolution conversion according to the embodiment.
Figure 4:
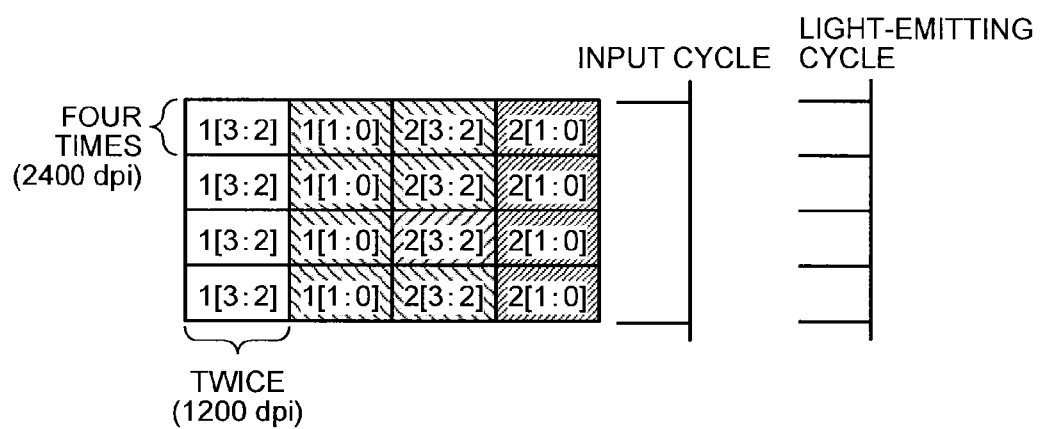
FIG. 4 is an exemplary diagram illustrating the image data after conducting the resolution conversion according to the embodiment.

FIG. 3 is a diagram illustrating one example of the image data prior to the resolution conversion according to the present embodiment. FIG. 4 is a diagram illustrating one example of the image data subsequent to the resolution conversion according to the present embodiment.

As described above, the image data input to the writing control unit 130 has the resolution of 600 dpi and the image data input to the skew correction unit 139 also has the resolution of 600 dpi (see FIG. 3). When the resolution of the image data in the sub-scanning direction processed by the LEDA 32 is 2400 dpi, the skew correction unit 139 writes the same image data in the sub-scanning direction four times to convert the resolution of the image data in the sub-scanning direction from 600 dpi to 2400 dpi (see FIG. 4). Thus, the skew correction unit 139 converts the resolution of the image data to that of the image data corresponding to the light-emitting cycle of the LEDA 32. When the resolution of the image data processed by the LEDA 32 is 1200 dpi, the skew correction unit 139 may write the same image data in the sub-scanning direction twice to convert the resolution of the image data in the sub-scanning direction from 600 dpi to 1200 dpi.

As described above, the image data input to the writing control unit 130 is represented by hexadecimal values. Therefore, the skew correction unit 139 processes the input image data as 4 bits per one pixel (see FIG. 3). When the resolution of the image data in the main-scanning direction processed by the LEDA 32 is 1200 dpi, the skew correction unit 139 redefines the number of bits per one pixel of the image data from 4 bits to 2 bits to convert the resolution of the image data in the main-scanning direction from 600 dpi to 1200 dpi (see FIG. 4).

Consequently, the resolution conversion performed by the skew correction unit 139 results in 8 pixels in the image data.

The gradation conversion unit 143 keeping a gradation conversion table refers to the gradation conversion table to convert the gradations for adjusting a shading of the image data transferred per one line by the skew correction unit 139 and transfer the image data per one line to the LEDA control unit 145. In the present embodiment, the gradations of the image data are converted from hexadecimal values to binary values, however, the gradation conversion is not limited thereto.

FIG. 5 is a diagram illustrating one example of the gradation conversion table according to the present embodiment. As illustrated in FIG. 5, the gradation conversion table includes pixel type information, a gamma look-up table, and setting values.

As described above, the image data input to the writing control unit 130 is represented by hexadecimal values.

Therefore, the pixel type information has 16 types of pixels from 0h to Fh (hexadecimal form).

FIG. 6 is a diagram illustrating one example of the gamma look-up table according to the present embodiment. In the gradation conversion table, the gamma look-up table lists an assignment of each bit of a setting value associated with the gamma look-up table. As illustrated in FIG. 6, the gamma look-up table shows that which bit of a setting value is assigned into a matrix with 4 rows and 2 columns associated with a sub-scanning position and odd/even dot. For example, the 7th-bit value of a setting value is assigned to the position on the matrix specified by the sub-scanning position "1" and the odd dot.

In this example, the matrix with 4 rows and 2 columns corresponds to image data with 8 pixels after the resolution conversion. Thus, the gradation conversion corresponding to a bit value assigned to the matrix with 4 rows and 2 columns is performed upon the image data with 8 pixels after the resolution conversion.

Notation # in FIG. 6 can be any value from 0 to F. For example, in the gradation conversion table, # is "0" when the gamma look-up table is assigned to the pixel type information "0h".

Referring back to FIG. 5, the setting values are 8-bit data, each of which is assigned to the matrix with 4 rows and 2 columns in the gamma look-up table. In the present embodiment, when the bit value of a setting value is "0", the pixel corresponding to the position on the matrix in which the bit value is assigned is set as white, and when the bit value of a setting value is "1", the pixel corresponding to the position on the matrix in which the bit value is assigned is set as black.

The gradation conversion unit 143 refers to the gradation conversion table illustrated in FIG. 5 to perform the matrix conversion for converting the gradations in the regular order in the normal mode while performing the matrix conversion for converting the gradations in the reverse order in the mirror mode. The gradation conversion unit 143 determines whether it is in the normal mode or the mirror mode by the same method as that of the above-mentioned writing control unit 130.

Specifically, when in the normal mode, the gradation conversion unit 143 performs matrix conversion that has contents illustrated in the gradation conversion table in FIG. 5, upon the image data transferred per one line by the skew correction unit 139.

Figure 7:
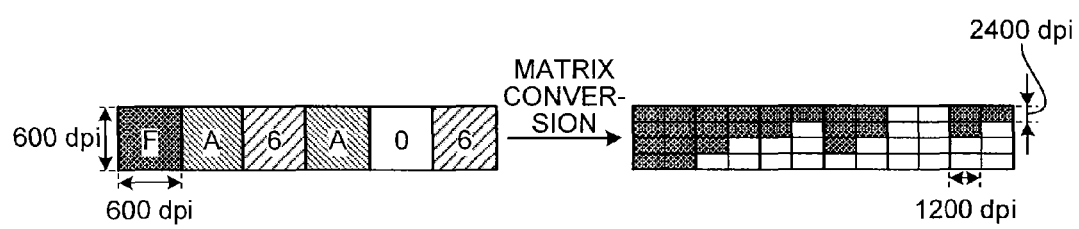
FIG. 7 is an exemplary diagram illustrating a matrix conversion for gradation conversion in a normal mode according to the embodiment.

FIG. 7 is an explanatory diagram illustrating one example of the matrix conversion for converting the gradations in a normal mode according to the present embodiment. In the example illustrated in FIG. 7, the image data before the matrix conversion represents the image data input to the writing control unit 130. For example, as for the pixel of "Ah" on the pixel type information (pixel represented as "A" in the drawings), the setting value is "8'b1110_1100" on the gradation conversion table illustrated in FIG. 5. Therefore, the sub-scanning position are "1", "2", and "3" (i.e., 7th, 6th and 5th bit), and the dot type is odd (i.e., "1" means odd). According to the bit value assigned to the matrix, the gradation conversion unit 143 performs the matrix conversion for converting the gradations that sets the pixel as black corresponding to the position on the matrix where the bit value is "1" among the 8 pixels corresponding to the pixel of "A".

When in the mirror mode, the gradation conversion unit 143 performs the matrix conversion that has contents reversing the contents that are listed in the gradation conversion table in FIG. 5, upon the image data transferred per one line by the skew correction unit 139. More specifically, the gradation conversion unit 143 performs the matrix conversion that has the contents listed in the gradation conversion table in FIG. 5, and reverses the image data after the matrix conversion in the main-scanning direction.

This is because the resolution conversion is also performed in the main-scanning direction and the image data is not correctly reversed unless the pattern of the matrix is also reversed to convert the gradations in a mirror mode in the present embodiment.

Figure 8:
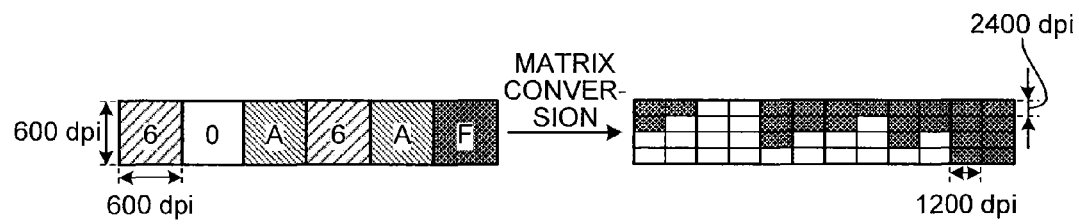
FIG. 8 is an exemplary diagram illustrating the matrix conversion for the gradation conversion in the normal mode being performed in a mirror mode.

FIG. 8 is an explanatory diagram illustrating one example of a case in which the matrix conversion for converting the gradations in the normal mode is performed in the mirror mode. In the example illustrated in FIG. 8, the image data before the matrix conversion represents the image data input to the writing control unit 130 as well.

In the example illustrated in FIG. 8, the order of the image data input to the writing control unit 130 is "6, 0, A, 6, A, F", which reverses the order in the normal mode (see FIG. 7). In the example illustrated in FIG. 8, because the matrix conversion for converting the gradations similar to that in the normal mode is performed despite in the mirror mode, the image data after the matrix conversion is not the image data reversing the image data after the matrix conversion illustrated in FIG. 7.

Therefore, when in the mirror mode, the gradation conversion unit 143 performs the matrix conversion for converting the gradations similar to that in the normal mode and then replaces the pixel corresponding to the odd dot with the pixel corresponding to the even dot in the present embodiment.

Figure 9:
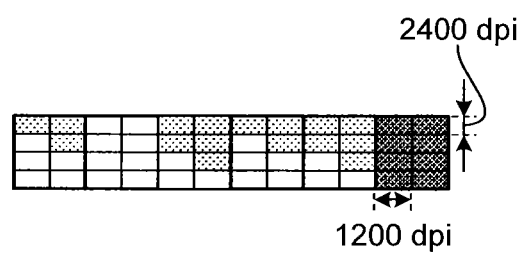
FIG. 9 is an exemplary diagram illustrating the matrix conversion for the gradation conversion in the mirror mode being performed according to the embodiment.

FIG. 9 is an explanatory diagram illustrating one example of a case in which the matrix conversion for converting the gradations in the mirror mode is performed according to the present embodiment. In the example illustrated in FIG. 9, the matrix conversion for converting the gradations similar to that in the normal mode is performed and then the pixel corresponding to the odd dot is replaced with the pixel corresponding to the even dot. Thus, the image data after the matrix conversion is the image data reversing the image data after the matrix conversion illustrated in FIG. 7.

In the present embodiment, the gradation conversion unit 143 is equipped with a replacing circuit that replaces the pixel corresponding to the odd dot with the pixel corresponding to the even dot as a stage following a converting circuit performing the matrix conversion so that the image data after the matrix conversion can be input to the replacing circuit only in the mirror mode.

The LEDA control unit 145 causes the LEDA head 32 to emit light based on the image data transferred per one line by the gradation conversion unit 143 to form an electrostatic latent image.

The control unit 150 controls the writing control unit 130 and sets whether it is in the normal mode or the mirror mode on the writing control unit 130.

Figure 10:
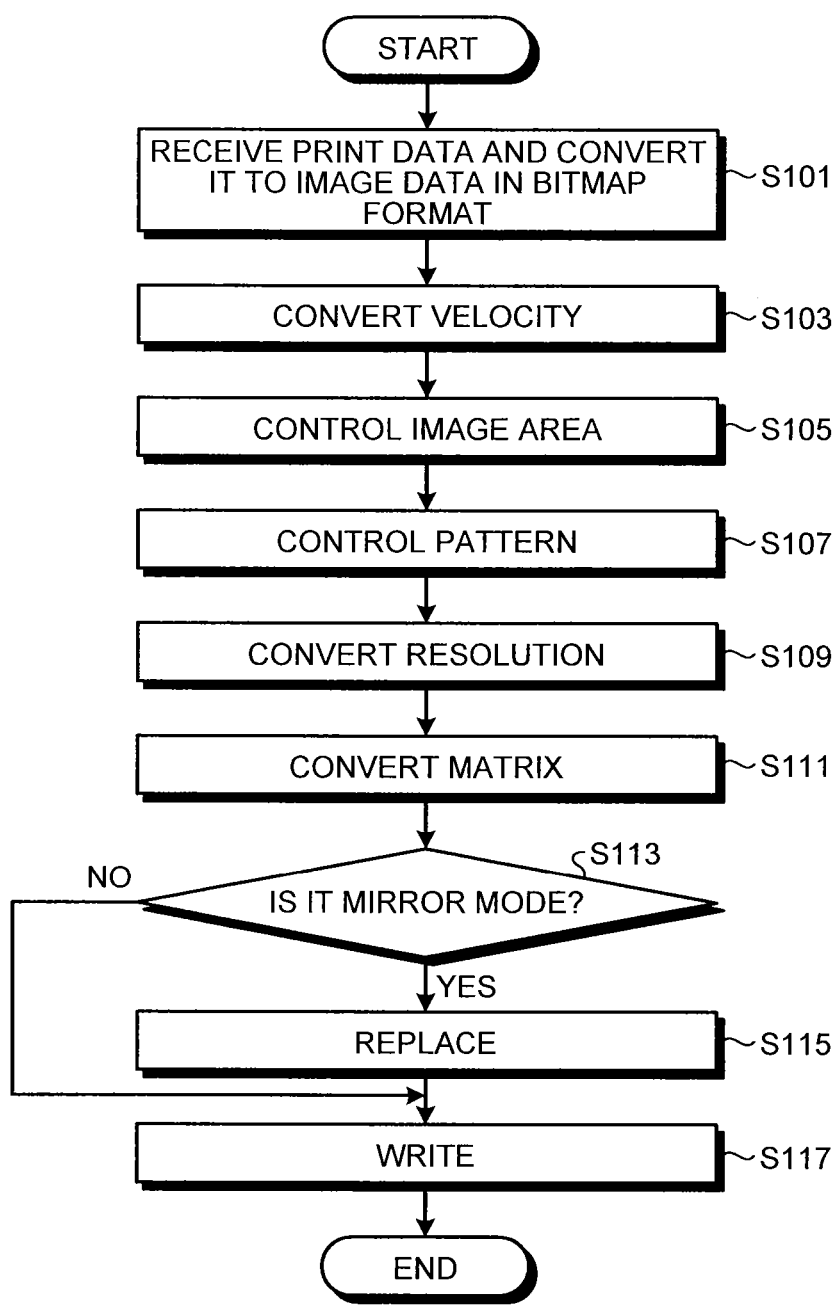
FIG. 10 is an exemplary flowchart illustrating a writing control operation that is executed by the printer according to the embodiment.

FIG. 10 is a flowchart illustrating one example of a writing control operation that is executed by the printer 10 according to the present embodiment.

The controller 110 receives print data created by the PC 50 and converts the received print data to image data in a bitmap format composed of a plurality of pixels on the page memory 120 (Step S101).

The velocity conversion unit 131 sequentially records the image data transferred per one line by the controller 110 in the line memory 133 and sequentially retrieves the recorded image data based on an operating clock of the writing control unit 130 to convert the velocity (frequency) (Step S103).

The image area control unit 135 controls the image size and a timing of the image data transferred per one line by the velocity conversion unit 131 to correct a positional deviation depending on the resolution (Step S105).

The pattern control unit 137 performs image processing such as processing to add an internal pattern and trimming processing upon the image data transferred per one line by the image area control unit 135 (Step S107).

The skew correction unit 139 controls the number of writing times of the image data transferred per one line to the line memories 141 to convert the resolution while correcting a skew (Step S109).

The gradation conversion unit 143 performs the matrix conversion that has contents illustrated in the gradation conversion table in FIG. 5 upon the image data transferred per one line by the skew correction unit 139 (Step S111).

When in the mirror mode (Yes at Step S113), the gradation conversion unit 143 replaces the pixel corresponding to the odd dot with the pixel corresponding to the even dot (Step S115).

When in the normal mode (No at Step S113), the gradation conversion unit 143 performs no operation of Step S115.

The LEDA control unit 145 causes the LEDA head 32 to emit light (perform a write operation) based on the image data transferred per one line by the gradation conversion unit 143 to form an electrostatic latent image (Step S117).

As described above, according to the present embodiment, the gradation conversion is correctly performed when the write operation is performed in either the regular order or the reverse order. In particular, in the present embodiment, the normal mode and the mirror mode differ in the operation executed by the gradation conversion unit 143. Therefore, the same gradation conversion table can be used in either the normal mode or the mirror mode.

Modifications

It should be noted that the present invention is not limited to the above-mentioned embodiment and various modifications may be made.

First Modification

For example, the above-mentioned embodiment demonstrates that, when in the mirror mode, the gradation conversion unit 143 performs the matrix conversion for converting the gradations similar to that in the normal mode and then replaces the pixel corresponding to the odd dot with the pixel corresponding to the even dot. However, the control unit 150 may rewrite the gradation conversion table.

Specifically, when in the normal mode, the control unit 150 rewrites the contents of the gradation conversion table kept by the gradation conversion unit 143 into the contents for the regular order. When in the mirror mode, the control unit 150 rewrites the contents of the gradation conversion table kept by the gradation conversion unit 143 into the contents reversing the contents for the regular order.

More specifically, when in the mirror mode, the control unit 150 replaces the odd dot with the even dot in the gamma look-up table kept by the gradation conversion unit 143 to rewrite it into the gamma look-up table illustrated in FIG. 11.

In a first modification, the normal mode and the mirror mode differ in the gradation conversion table (gamma look-up table). Therefore, the gradation conversion unit 143 can execute the same operation in either the normal mode or the mirror mode, thereby reducing the costs such as a reduction in the number of circuits.

Second Modification

The above-mentioned embodiment provides the example of achieving the exposing (writing) mechanism with the LEDA head 32; however, the exposing mechanism may be achieved with an organic electroluminescence array (Organic ELA) or a laser diode array (LDA).

Third Modification

The above-mentioned embodiment provides the example in which each image making unit directly forms an image on a print sheet. However, each image making unit may form an image on an intermediate transfer belt so that the image can be transferred on a print sheet from the intermediate transfer belt.

Hardware Configuration

Figure 12:
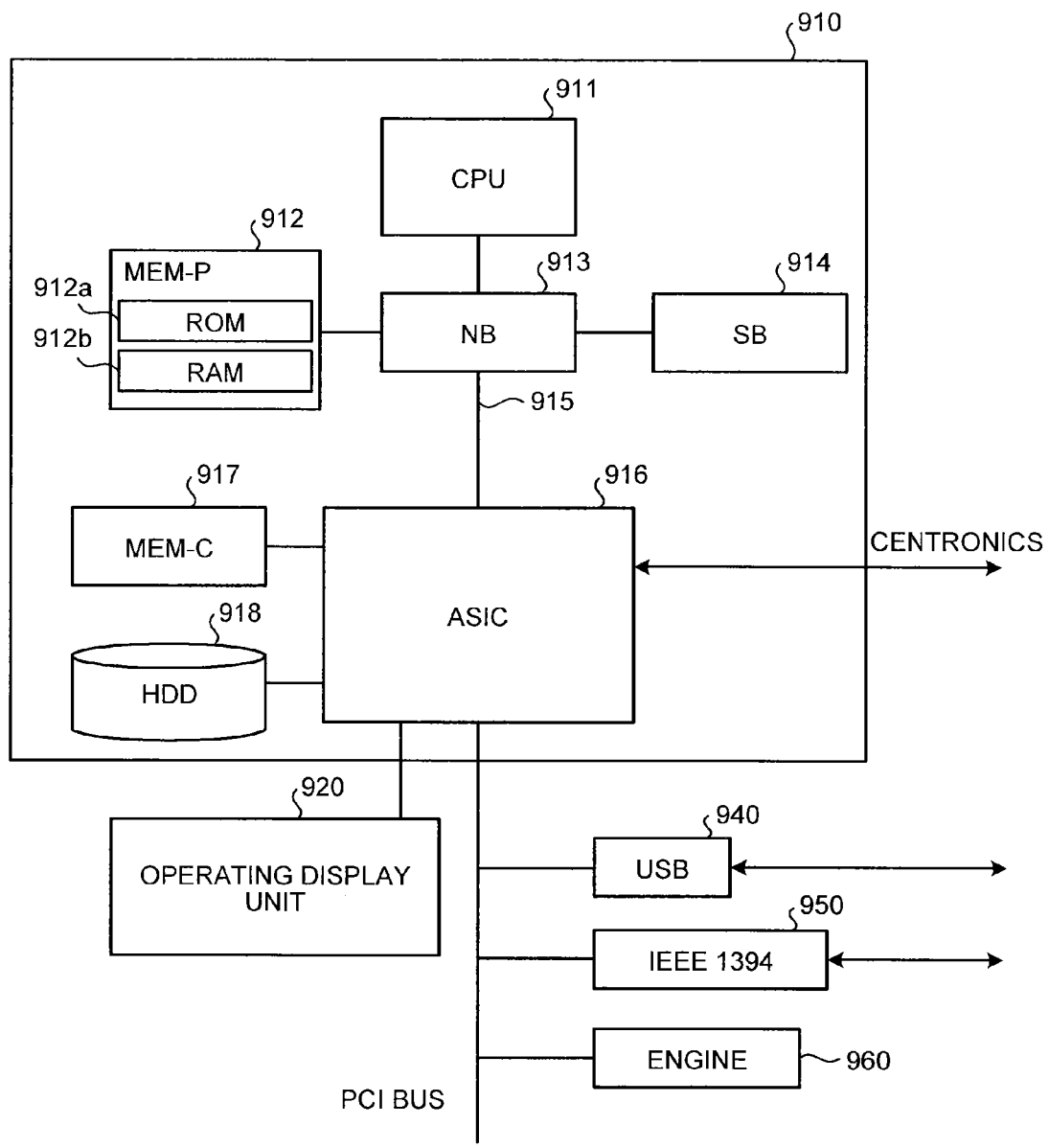
FIG. 12 is an exemplary block diagram illustrating the hardware configuration of the printer according to the embodiment and modifications.

FIG. 12 is a block diagram illustrating one example of the hardware configuration of the printer according to the embodiment and modifications. As illustrated in FIG. 12, the printer according to the above-mentioned embodiment and modifications includes a controller 910 and an engine unit 960 that are connected to each other via a peripheral component interconnect (PCI) bus. The controller 910 is a controller that controls the entire MFP, drawing, communications, and an input from an operating display unit 920. The engine unit 960 is, for example, a printer engine connectable to the PCI bus such as a black-and-white plotter, a one-drum color plotter, a four-drum color plotter, a scanner, or a fax unit. This engine unit 960 includes an image processing section such as error diffusion and gamma conversion, in addition to what is called an engine section including a plotter.

The controller 910 includes a central processing unit (CPU) 911, a north bridge (NB) 913, a system memory (MEM-P) 912, a south bridge (SB) 914, a local memory (MEM-C) 917, an application specific integrated circuit (ASIC) 916, and a hard disk drive (HDD) 918. The NB 913 and the ASIC 916 are connected to each other via an accelerated graphics port (AGP) bus 915. The MEM-P 912 includes a read-only memory (ROM) 912*a* and a random access memory (RAM) 912*b*.

The CPU 911 that controls the entire MFP includes a chipset composed of the NB 913, the MEM-P 912, and the SB 914, and is connected to other apparatuses via this chipset.

The NB 913, which is a bridge for connecting the CPU 911 to the MEM-P 912, the SB 914, and the AGP bus 915, includes a memory controller, a PCI master, and an AGP target. The memory controller controls a read/write operation to the MEM-P 912.

The MEM-P 912 is a system memory used as a memory for storing therein computer programs or data, a memory for loading computer programs or data, or a memory for drawing by a printer. The MEM-P 912 includes the ROM 912*a* and the RAM 912*b*. The ROM 912*a* is a read-only memory used as a memory for storing therein computer programs or data while the RAM 912*b* is a writable and readable memory used as a memory for loading computer programs or data, or a memory for drawing by a printer.

The SB 914 is a bridge for connecting the NB 913 to the PCI device and a peripheral device. This SB 914 is connected to the NB 913 via the PCI bus. This PCI bus is connected to a network interface (I/F) unit and the like.

The ASIC 916 is an integrated circuit (IC) including hardware components for image processing and used for the image processing. The ASIC 916 acts as a bridge for connecting the AGP bus 915, the PCI bus, the HDD 918, and the MEM-C 917 to one another. This ASIC 916 includes a PCI target, an AGP master, an arbiter (ARB) constituting the core of the ASIC 916, a memory controller for controlling the MEM-C 917, a plurality of direct memory access controllers (DMACs), for example, for rotating the image data using hardware logic, and a PCI unit for transferring data with the engine unit 960 via the PCI bus. This ASIC 916 is connected to a universal serial bus (USB) 940 and an Institute of Electrical and Electronics Engineers 1394 (IEEE1394) interface 950 via the PCI bus. The operating display unit 920 is directly connected to the ASIC 916.

The MEM-C 917 is a local memory used as an image buffer for copying and a code buffer. The HDD 918 is a storage for storing therein image data, computer programs, font data, and forms.

The AGP bus 915, which is a bus interface for a graphics accelerator card developed in order to accelerate graphics processing, directly accesses the MEM-P 912 with a high throughput to accelerate the graphics accelerator card.

The present invention provides an effect of correctly performing the gradation conversion when the write operation is performed in either the regular order or the reverse order.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
    processing circuitry configured to
        increase resolution of pixels provided by input image data by at least a factor of two in both a main scanning direction and a sub scanning direction; and
        perform matrix conversion of each pixel whose resolution is increased, with reference to a gradation conversion table; and
    writing circuitry configured to perform a write operation according to the matrix-converted pixels, wherein
    the image forming apparatus includes a normal mode and a reverse mode,
    in the normal mode, the processing circuitry performs the matrix conversion of the pixels with reference to the gradation conversion table, and the writing circuitry performs the write operation of the pixels in a normal order, which is an order image data is input into the image forming apparatus, and
    in the reverse mode, the processing circuitry reverses the normal order of the pixels in the main-scanning direction and performs matrix conversion of each reversed pixel with reference to the gradation conversion table to generate odd and even dots, each having subpixels, wherein the subpixels corresponding to the odd dots are replaced with the subpixels corresponding to the even dots, and the writing circuitry performs the write operation of the reversed pixels.

2. The image forming apparatus set forth in claim 1, wherein the processing circuitry determines either the normal mode or the reverse mode, based on one of a group consisting of a register setting, an external signal, and a type of the writing circuitry.

3. The image forming apparatus set forth in claim 1, wherein the writing circuitry is one of a light emitting diode array (LEDA), an organic electroluminescence array (Organic ELA), and a laser diode array (LDA).

4. An image forming apparatus, comprising:
    processing circuitry configured to
        increase resolution of pixels provided by input image data by at least a factor of two in both a main scanning direction and a sub scanning direction, and
        perform matric conversion of each pixel whose resolution is increased; and
    writing circuitry configured to perform a write operation according to the matrix-converted pixels,
    wherein the image forming apparatus includes a normal mode and a reverse mode,
    in the normal mode, the processing circuitry performs the matrix conversion of the pixels with reference to a gradation conversion table for the normal mode, and the writing circuitry performs the write operation of the pixels in a normal order, which is an order image data is input into the image forming apparatus, and
    in the reverse mode, the processing circuitry reverses the normal order of the pixels in the main-scanning direction and performs matrix conversion of each reversed pixel with reference to a gradation conversion table for the reverse mode to generate odd and even dots, each having subpixels, wherein the subpixels corresponding to the odd dots are replaced with the subpixels corresponding to the even dots, and the writing circuitry performs the write operation of the reversed pixels.

5. The image forming apparatus set forth in claim 4, wherein, in the reverse mode, a control circuit rewrites the contents listed in the gradation conversion table for the normal mode into the contents inverted in a main-scanning direction, to obtain the gradation conversion table for the reverse mode.

6. A method performed by an image forming apparatus, the method comprising:
    increasing resolution of a pixels provided by input image data by at least a factor of two in both a main scanning direction and a subscanning direction;
    performing matrix conversion of each pixel whose resolution is increased, with reference to a gradation conversion table; and
    performing a write operation according to the matrix-converted pixels, wherein
    the image forming apparatus includes a normal mode and a reverse mode,
    the step of performing matrix conversion further comprises, in the normal mode, performing matrix conversion of the pixels with reference to the gradation conversion table, and the writing step comprises, in the normal mode, performing the write operation of the pixels in a normal order, which is an order image data is input into the image forming apparatus, and
    the step of performing matrix conversion further comprises, in the reverse mode, reversing the normal mode of the pixels in the main-scanning direction and performing matrix conversion of each reversed pixel with reference to the gradation conversion table to generate odd and even dots, each having subpixels, wherein the subpixels corresponding to the odd dots are replaced with the subpixels corresponding to the even dots, and the writing step comprises, in the reverse mode, performing the write operation of the reversed pixels.

7. A non-transitory computer-readable medium including a computer program product, the computer program product comprising instructions which, when executed by a computer, causes the computer to perform the method set forth in the claim 6.

* * * * *